(12) United States Patent
Urrabazo et al.

(10) Patent No.: US 8,108,795 B2
(45) Date of Patent: Jan. 31, 2012

(54) SYSTEM AND METHOD FOR THE VISUALIZATION OF SPORTS INFORMATION

(75) Inventors: Roger Urrabazo, Gilroy, CA (US); Kumiko T. Toft, Carlsbad, CA (US); Eric Lin, San Jose, CA (US); John La, San Jose, CA (US); Sushant Kumar, Sunnyvale, CA (US); Eric Del Balso, San Francisco, CA (US); Michael Mills, Redwood City, CA (US); Manlio Armando Lo Conte, San Francisco, CA (US)

(73) Assignee: Yahoo! Inc., Sunnyvale, CA (US)

( * ) Notice: Subject to any disclaimer, the term of this patent is extended or adjusted under 35 U.S.C. 154(b) by 313 days.

(21) Appl. No.: 11/622,329

(22) Filed: Jan. 11, 2007

(65) Prior Publication Data
US 2008/0066011 A1 Mar. 13, 2008

Related U.S. Application Data

(60) Provisional application No. 60/843,520, filed on Sep. 7, 2006.

(51) Int. Cl.
*G06F 3/048* (2006.01)
(52) U.S. Cl. .......................... 715/810; 715/811; 715/825
(58) Field of Classification Search .................. 715/810, 715/811, 825
See application file for complete search history.

(56) References Cited

U.S. PATENT DOCUMENTS

| | | | | |
|---|---|---|---|---|
| 5,929,932 A * | 7/1999 | Otsuki et al. | ..................... | 725/47 |
| 5,995,092 A * | 11/1999 | Yuen et al. | ..................... | 725/40 |
| 6,078,348 A * | 6/2000 | Klosterman et al. | ............ | 725/40 |
| 6,151,059 A * | 11/2000 | Schein et al. | ..................... | 725/37 |
| 6,311,329 B1 * | 10/2001 | Terakado et al. | ................ | 725/44 |
| 6,324,338 B1 * | 11/2001 | Wood et al. | ..................... | 386/83 |
| 6,371,855 B1 * | 4/2002 | Gavriloff | ........................ | 463/42 |
| 6,925,650 B1 * | 8/2005 | Arsenault et al. | ................ | 725/39 |
| 6,984,176 B2 * | 1/2006 | Bishop | ............................ | 463/42 |
| 7,001,279 B1 * | 2/2006 | Barber et al. | ................... | 463/42 |
| 7,139,983 B2 * | 11/2006 | Kelts | ............................ | 715/802 |
| 7,386,871 B1 * | 6/2008 | Knudson et al. | ................ | 725/92 |
| 7,458,093 B2 * | 11/2008 | Dukes et al. | .................... | 725/141 |
| 2001/0043795 A1 * | 11/2001 | Wood et al. | ..................... | 386/69 |
| 2002/0056104 A1 * | 5/2002 | Burnhouse et al. | ............ | 725/39 |
| 2004/0068740 A1 * | 4/2004 | Fukuda et al. | .................. | 725/45 |
| 2004/0107439 A1 * | 6/2004 | Hassell et al. | .................. | 725/44 |
| 2004/0117831 A1 * | 6/2004 | Ellis et al. | ........................ | 725/53 |
| 2004/0158638 A1 * | 8/2004 | Peters et al. | ................... | 709/227 |
| 2005/0138656 A1 * | 6/2005 | Moore et al. | .................... | 725/45 |

(Continued)

FOREIGN PATENT DOCUMENTS
WO WO 0033576 A1 * 6/2000

*Primary Examiner* — William Bashore
*Assistant Examiner* — Gregory A Distefano
(74) *Attorney, Agent, or Firm* — Ostrow Kaufman LLP

(57) ABSTRACT

The present invention is directed to a system and method for visualizing information, e.g., information regarding a sporting event. The method may comprise identifying an event type and generating a plurality of buttons, the plurality of buttons arranged in a button hierarchy. A first level of the button hierarchy comprising one or more first level buttons is displayed with a lens further displayed on a given one of the one or more first level buttons, the lens operative to present first level data for the given first level button.

10 Claims, 13 Drawing Sheets

U.S. PATENT DOCUMENTS

| | | |
|---|---|---|
| 2006/0095937 A1* | 5/2006 | Knudson et al. .................. 725/45 |
| 2006/0123335 A1* | 6/2006 | Sanchez et al. ................ 715/517 |
| 2006/0183547 A1* | 8/2006 | McMonigle ..................... 463/40 |
| 2007/0060380 A1* | 3/2007 | McMonigle et al. ............ 463/42 |
| 2007/0113250 A1* | 5/2007 | Logan et al. ..................... 725/46 |
| 2008/0026804 A1* | 1/2008 | Baray et al. ........................ 463/9 |
| 2008/0062318 A1* | 3/2008 | Ellis et al. ...................... 348/564 |

* cited by examiner

SYSTEM AND METHOD FOR THE VISUALIZATION OF SPORTS INFORMATION

The present application is claims priority to U.S. Provisional Application No. 60/843,520, entitled "SYSTEM AND METHOD FOR THE VISUALIZATION OF SPORTS INFORMATION," filed on Sep. 7, 2006, the disclosure of which is hereby incorporated by reference herein in its entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the patent and trademark office patent files or records, but otherwise reserves all copyright rights whatsoever.

RELATED APPLICATIONS

The present invention is related to U.S. patent application Ser. No. 11/261,436, entitled "FRAMEWORK FOR DIGITAL HOME SERVICES," filed on Oct. 27, 2005, the disclosure of which is hereby incorporated by reference herein in its entirety.

FIELD OF THE INVENTION

Embodiments of the present invention relate to data visualization. More specifically, embodiments of the present invention are directed towards systems and methods for visualizing information for a sporting event, which may be live or recorded, as well as fantasy sports information.

BACKGROUND OF THE INVENTION

When viewing sporting events, users are face the dilemma of being able to watch only one sporting event at a given time, as well as being limited with regard to the amount of information that a given user may consume regarding a plurality of sporting events. When watching a sporting event, the user may watch only a single sporting event at a given time. Although multiple channels may be tuned simultaneously, e.g., through the use of picture in picture ("PIP") functionality, there are significant drawbacks regarding sound and the size of a given PIP display (which typically consumes a smaller portion of a the viewable area of a display device than a full screen image).

Similarly, when viewing sporting events, a user is limited with regard to statistical information that they may consume. For example, the user may be limited to the statistical information that a given broadcaster decides to transmit with the display of a given sporting event. Although the user may utilize a non-television source to retrieve statistics information that they desire regarding a given team or player, e.g., through the use of the Internet, this causes the user to divert attention from the television or other client device that is displaying the sporting event to locate and examine the desired statistics.

In addition to the foregoing, these information sources are not feature integration for the support of a fantasy sports platform. Current techniques do not integrate the playing fantasy sports with the viewing of sporting events, both live and recorded, upon which the fantasy sport is based. Accordingly, a user may be required to utilize up to three disparate platforms to view a sporting event, locate and retrieve statistics information regarding the sporting event and participate in a fantasy league for the game upon which the sporting event is based.

Thus, there is a need for an integrated platform for the presentation of sporting events and fantasy sports competitions, as well as statistics and related information regarding the same. There is also a need for novel systems and methods for the visualization and navigation of such information.

SUMMARY OF THE INVENTION

Embodiments of the present invention are directed towards systems and methods for the visualization of information according to a plurality of levels of granularity. A method for the visualization of information according to one embodiment comprises identifying an event type and generating a plurality of buttons, the plurality of buttons arranged in a button hierarchy, which may be made on the basis of the identified event type. A first level of the button hierarchy is displayed, the first level of the button hierarchy comprising one or more first level buttons. A lens is displayed on a given one of the one or more first level buttons, the lens operative to present first level data for the given first level button.

Systems and methods in accordance with embodiments of the present invention may be operative to visualize multiple disparate types of information from multiple disparate event types. According to one embodiment, the method is operative to visualize information where the event type is a sporting event. A sporting event may be selected from the set of events consisting of football, baseball, basketball, hockey, soccer and rugby. The event may also be a fantasy sporting event, such as fantasy football, fantasy baseball, fantasy basketball, etc.

The first level data in a given first level button may change dynamically in response to changes in data that the button is operative to visualize. Alternatively, or in conjunction with the foregoing, data may change dynamically in response to the lens being placed over a given first level button in the button hierarchy. Accordingly, the method may comprise navigating the lens between the one or more first level buttons and wherein the first level data changes as a function of a given first level button. An informational display pane may also be presented in conjunction with the button hierarchy, with the method comprising modifying information that the informational display pane displays in response to the navigation. The information in the informational display pane may be related to the given first level button upon which the lens is focusing.

When the lens is focusing upon a given first level button, a user may select the given first level button, causing the display of one or more second level buttons that are related to the given first level button. Similar to a first level button in the button hierarchy, a given second level button may display second level data for the given second level button. A user may navigate the lens between the one or more second level buttons with the second level data changing as a function of a given second level button. The user may select a given second level button causing the display of one or more third level buttons that are related to the given second level button.

BRIEF DESCRIPTION OF THE DRAWINGS

Further objects, features and advantages of the invention will become apparent from the following detailed description taken in conjunction with the accompanying drawings showing illustrative embodiments of the invention, in which.

DETAILED DESCRIPTION OF THE INVENTION

In the following description of embodiments of the invention, reference is made to the accompanying drawings that form a part hereof and in which is shown by way of illustration a number of specific embodiments in which the invention may be practiced. It is to be understood that other embodiments may be utilized and structural changes may be made without departing from the scope of the present invention.

Figure 1:
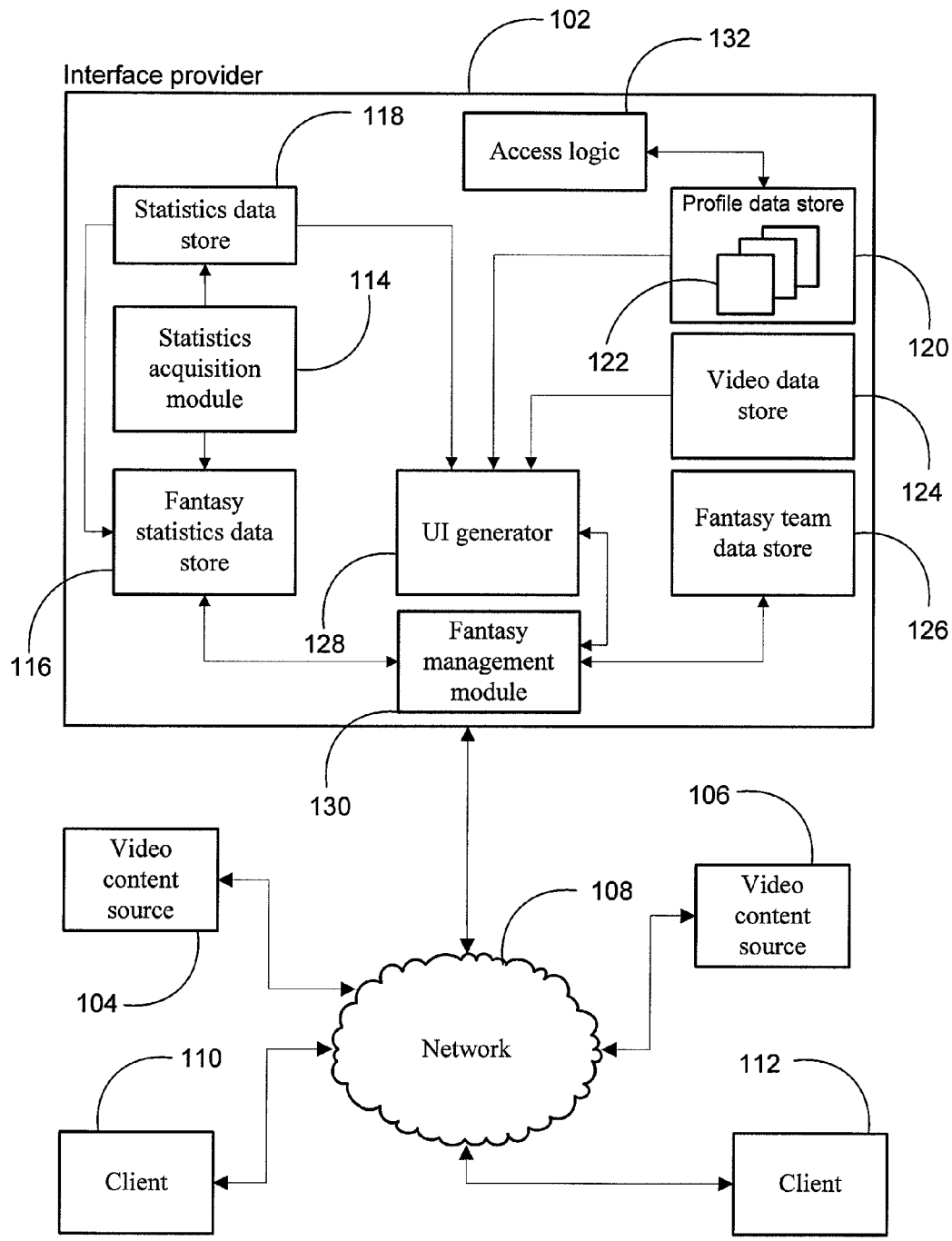
FIG. 1 is a block diagram presenting a system for visualizing sports and fantasy sports information according to one embodiment of the present invention.

FIG. 1 is a block diagram illustrating one embodiment of a system for visualizing information for a sporting event including, but not limited to, football, baseball, basketball, soccer, etc. Indeed, as the present description should make clear to one of skill in the art, the systems and methods of the present invention are applicable to all permutations of sporting events, which includes both actual sporting events (live and recorded) and fantasy league sporting events.

According to the embodiment illustrated in FIG. 1, client devices 110 and 112 are communicatively coupled to a network 108, which may include a connection to one or more local and wide area networks, such as the Internet. According to one embodiment of the invention, a client device 110 and 112 is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

Client devices 110 and 112, in communication with the network 108, may exchange data with one or more video content sources 104 and 106 to request video content items and receive video content items are responsive to a given request. For example, where a user of a client device 110 and 112 wishes to watch a live NFL game, the users utilizes a given client device 110 and 112 to request a video content item for the live NFL game from a given video content source 104 and 106 receive the video content item for display. According to one embodiment, logic or program code at the client device 110 and 112 (which is described in greater detail in the applications incorporated herein by reference) is operative to decode the video content item that the client receives for presentation on a display device. Those of skill in the art recognize that video content items may be received by a tuner at the client device 110 and 112 that is tuned to a given broadcast frequency to receive and present a video content item from a video content source 104 and 106. A given client device 110 and 112 may utilize other techniques known to those of skill in the art to receive a given video content item.

Client devices 110 and 112 may receive disparate types of video content items from a plurality of disparate video content sources 104 and 106. According to embodiments of the invention, a given video content source 104 and 106 may comprise a broadcast site, a cable transmission headend facility, a point-to-multipoint transmission facility and a multipoint-to-multipoint transmission facility, each requiring respective network infrastructure well known to those of skill in the art. Video content items at a given video content source 104 and 106 may be structured in a data store to allow the video content source 104 and 106 to retrieve a given video content item in response to a request from a client device 110 and 112. A data store at the video content source may comprise a flat file data structure (e.g., tab or comma separated value file), relational database, objected oriented database, a hybrid object-relational database, etc.

Video content items that a given video content source 104 and 106 maintains for consumption by client device 110 and 112 may represent any type of video programming. According to one embodiment of the invention, video content items at the video content source 103 and 106 represent events, which may be occurring live (stored at the video content source in real or near real time) or previously recorded. More specifically, an event may be a sporting event, such as a football, baseball, hockey, soccer, etc. game. As a sporting event or game progresses, it may be written to the video content source 104 and 106 for subsequent transmission to a requesting client device 110 and 112. Alternatively, the video content source 104 and 106 may directly transmit a video content item representing a game to a client device 110 and 112 (such as in a broadcast distribution environment), which may include recording a copy of the game at the video content source 104 and 106.

Video content items at the video content source 104 and 106 may be stored in accordance with a variety of analog and digital formats including, but not limited to, NTSC, PAL, MPEG2 and H.264. Where the video content item is a game or sporting event, event statistics regarding the sporting event may be generated. For example, where the sporting event is a football game, aggregate statistics regarding team performance and individual statistics regarding one or more players may be generated. The video content source 104 and 106 may encode the event statistics into a given video content item, such that event statistics and video programming data comprise a single video content item. Alternatively, the video content source (or other servers in communication with the network 108) may maintain event statistics as one or more separate content items from a given video content item, and may also maintain relationships between event statistics and video content items. Collection of event statistics may be done in real time, near real time or subsequently with regard to performance of a given event.

Embodiments of the present invention comprise an interface provider 102 that is operative to supply visualization of information regarding a given video content item available from one or more video content sources 104 and 106, e.g., video content and event statistics. According to one embodiment, the interface provider 102 comprises a statistics acquisition module 114, a fantasy management module 130, access logic 132 and a user interface ("UI") generator 128. The interface provider 102 also comprises one or more data stores (situated locally or remotely to the interface provider 102) including, but not limited to, a statistics data store 118, a fantasy statistics data store 116, a profile data store 124, a fantasy team data store 126 and a video data store 124. It should be noted by those of skill in the art that the components and data stores of the interface provider 102 need not reside in the same location or device and may be remote to each other and in communication over the network 108.

Program code resident at the access logic 132 is operative to receive a request for access from a client device 110 and 112. For example, a request for access may comprise transmission of a username and password by the client device 110 and 112 to an address on the network 108 that identifies the interface provider 102. The access logic may retrieve a user profile 122 on the basis of a username that the access logic 132 receives to check the accuracy of the password. Where the user is properly authenticated as a valid user of the interface provider 102, the UI generator 128 retrieves the profile 122 for the user and provides a user interface to the client device 110 and 112 on the basis thereof. Where the access logic 132 is unable to properly authenticate the user as a valid user of the interface provider 102, the access logic 132 may prevent access to the interface provider 102. Alternatively, the access logic 132 may provide the user with an opportunity to register as a user of the interface provider, e.g., by providing authentication credentials, preferences, payment information, etc.

A profile 122 for a given user at the profile data store 120 may maintain fantasy team and league information for the user with regard to sporting events that are distributed as video content items by a video content source 104 and 108. Fantasy team and league information form the basis of a fantasy sporting system that is maintained by the fantasy management module 130 and with which the user interacts with through the UI generator 128. A fantasy sport is a game in which users build fantasy sporting teams by selecting players from an actual professional or amateur league that participates in the sport. Groups of users form fantasy leagues in which their respective fantasy teams compete on the basis of the statistics of the actual players that comprise a given fantasy team. According to one embodiment, the statistical performance of a given actual player is converted into points and totaled or otherwise manipulated to generate a score for a given fantasy team.

The fantasy management module 130 may utilize team and league information to manage one or more fantasy teams for a given user and one or more fantasy leagues for a plurality of users. The fantasy management module 130 is operative to maintain fantasy team information for users of the interface provider 102 in a fantasy team data store 126, which may also include the maintenance of fantasy league information. According to one embodiment, the fantasy team data store 126 maintains the players that comprise a fantasy team for a given user, which may be on a per fantasy league basis to allow the same player to be on different fantasy teams in different fantasy leagues. This is also referred to as maintaining one or more team rosters for the fantasy teams comprising a given fantasy league.

The fantasy management module 130 receives instructions from a given client 110 and 112 as to team and league information, which the fantasy management module 130 utilizes in the management of the fantasy team or league for the user. This may also include the management of preferences or other personalization information regarding a given fantasy team or league in which the user participates.

The fantasy management module 130 may further be in communication with a fantasy statistics data store 116. According to one embodiment, the fantasy statistics data store 116 receives event statistics information from a statistics acquisition module 114, which the fantasy management module 130 utilizes to calculate points for the fantasy teams that it maintains in the fantasy team data store 126. The fantasy statistics data store 116 may maintain fantasy statistics on the basis of players, leagues, fantasy team or fantasy leagues. As is explained in greater detail herein, the fantasy management module 130 utilizes fantasy team and fantasy league information from the fantasy team data store 126 in conjunction with fantasy statistics information from the fantasy statistics data store 116 to provide the UI generator 128 with information for the presentation of head to head and points based variants of a given fantasy sports game. These fantasy sports games are transmitted over the network 108 for display to the user through a novel user interface that the UI generator 128 provides for the visualization and navigation of the fantasy information (e.g., fantasy team, fantasy league and fantasy statistics information).

In addition to providing player and team statistics to the fantasy statistics data store 116, the statistics acquisition module 114 stores player and team statistics in a statistics data store 118. The statistics acquisition module 114 is operative to interface with a statistics source for the retrieval of statistics regarding players and teams of a given sport. According to one embodiment, the statistics acquisition module 114 retrieves player and team statistics (which may include related player and team information, e.g., player name and number, team hometown, etc.) from a video content source 104 and 106, such as by decoding statistics encoded into a given video content item or from a data store at a video content source. Alternatively, or in conjunction with the foregoing, the statistics acquisition module 114 may retrieve statistics from an alternative sport statistics service (not pictured). Regardless, a statistics data store 118 maintains player and team statistics for one or more sports. Preferably, the statistics data store 118 maintains statistics for events that correlate with video content items for events in the video data store 124

As indicated above, the interface provider 102 may comprise a video data store 124 for the storage of video content items. According to one embodiment, the interface provider 102 may receive a video content item for a given event that it retransmits to requesting client devices 110 and 112 through the use of the UI generator 128. The interface provider 102 may store these video content items in the video data store 124. Similarly, the video content store 124 may record video content items for one or more events for playback by clients 110 and 112 in a time shifted manner by the UI generator 128, e.g., by acting as a network digital video recorder.

For a given user as identified by his or her profile 122, logic or program code at the UI generator 128 utilizes statistics from the statistics data store 118, fantasy information from the fantasy management module 130 and video content items from the video data store 124 to display video and visualize information regarding one or more sporting events and fantasy sports activity to a client device 110 and 112 of a given user. The UI generator 128 visualizes information regarding fantasy sports and professional or amateur sporting events through the use of hierarchy of buttons that dynamically visualize data on the basis of sport and fantasy sport information, as well as the position of a given button in the hierarchy. The UI generator 128 provides a lens that the user may manipulate or otherwise navigate to select a button and view dynamically changing information visualized therein. The button hierarchy and specific buttons may be dependent upon a current video content item for a given sporting event that the user is currently viewing. Accordingly, the UI generator 128 provides for visualization of actual and fantasy sporting information for viewing in conjunction with the playback of a video content item. Specific examples of a button hierarchy and dynamically changing data are described in greater detail herein.

The present application incorporates U.S. patent application Ser. No. 11/261,436, which provides a framework for shared viewing of video content items at disparate locations in communication with the network 108. According to one embodiment, the interface provider 102 of the present invention operates as a component in the framework, allowing for shared viewing of a sporting event, which includes a communication channel between users participating in the shared viewing. Accordingly, a given user who logs into the interface provider may exchange voice chat or instant message with his or her buddies when watching a given video content item, in addition to participating in a group viewing of the video content item. A given communication channel allows a user and his or her buddies to engage in "smack talk" regarding a video content item that the group is watching.

Figure 2:
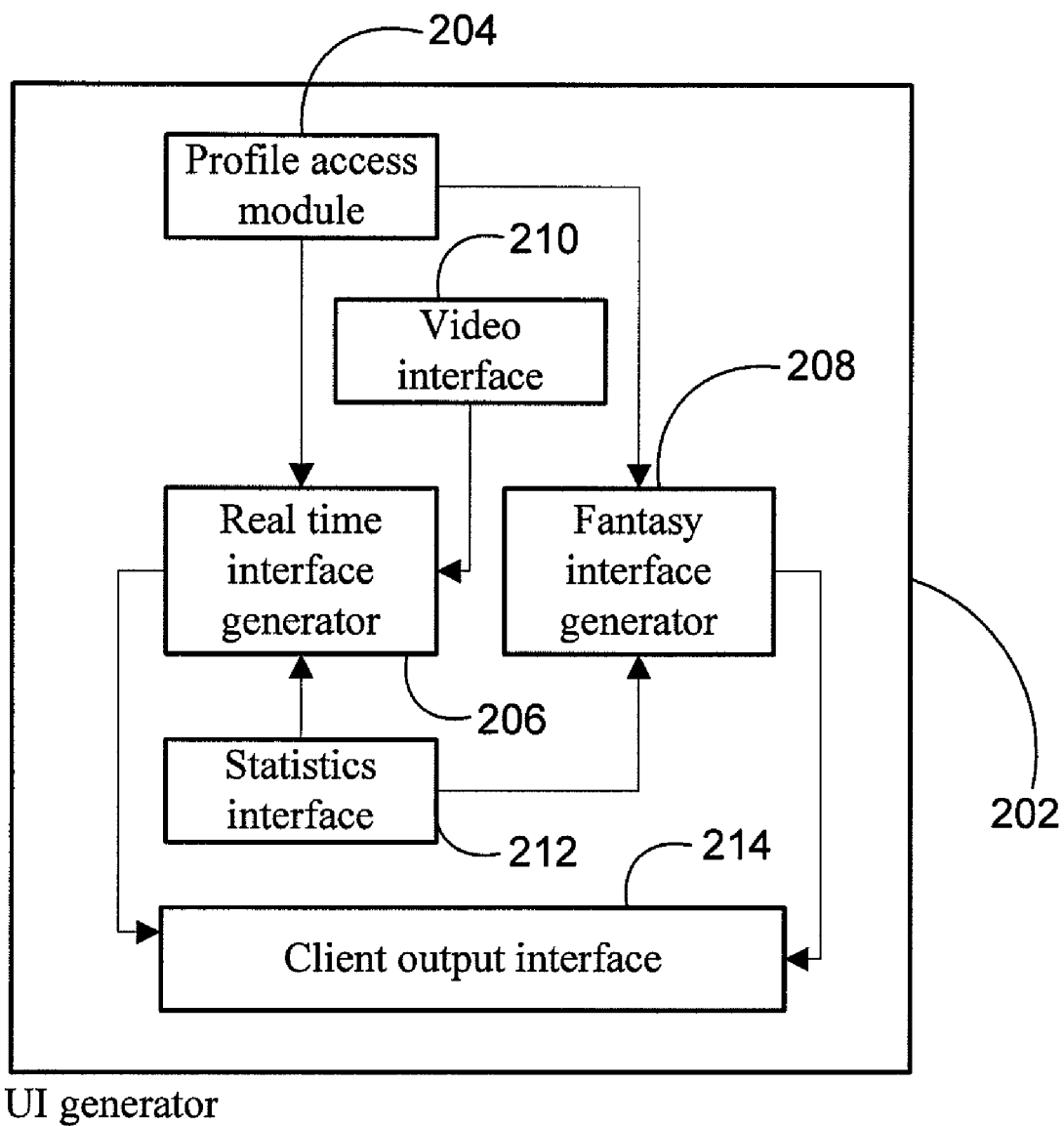
FIG. 2 is a flow diagram illustrating a modules of a user interface for the visualization of sports and fantasy sports information according to one embodiment of the present invention.

FIG. 2 illustrates one embodiment of the components comprising the UI generator introduced in FIG. 1. According to FIG. 2, the user interface generator 202 comprises a profile access module 204, a real time interface generator 206, a fantasy interface generator 208, a video interface 210, a statistics interface 212 and a client output interface 214. When a user authenticates himself or herself as a valid user of the interface provider, the access logic may instruct the profile access module 204 to retrieve the profile for the given user. The profile may indicate a default video content item for playback upon validation, e.g., a live sporting event or a previously recorded sporting event. The UI generator 202 retrieves a video content item that the profile indicates by accessing the video content item in a video data store via the video interface 210. The video interface 210 may comprise logic or program code that allows the UI generator 202 to playback a given video content item, which may include decoding a given encoded video content item. For example, where the video content item is encoded in the MPEG2 format, the video interface 210 may comprise an MPEG2 video codec to decode the video content item for presentation by the UI generator 202.

The UI generator 202 also comprises a real time interface generator 206 and a fantasy interface generator 208, comprising program code operative to generate a button hierarchy for actual sporting events and fantasy sporting events, respectively. Although the term "real time" is utilized in conjunction with the real time interface generator 206, this interface is operative to visualize data for sporting events that are occurring in real time, near real time or being played back from a previously recorded sporting event, as opposed to fantasy sporting events, such as a points based match-up between teams participating in a fantasy football league.

Both the real time interface generator 206 and the fantasy interface generator 208 are in communication with the statistics interface 212 through which a given generator 206 and 208 retrieves statistics for visualization, which may occur in conjunction with playback of a video content item, e.g., visualization of data regarding one or more football games while viewing a playback of a given one of the one or more football games. The real time interface generator 206 may retrieve statistics regarding sporting events that are currently in progress or recorded for playback, depending on the video content item or items that the user selects for playback. Similarly, the fantasy interface generator 208 retrieves fantasy sports statistics on the basis of the identity of the user from his or her profile and any fantasy leagues to which the user belongs. According to one embodiment, the fantasy interface generator 208 retrieves the fantasy sports statistics and related information from the fantasy management module.

Figure 7:
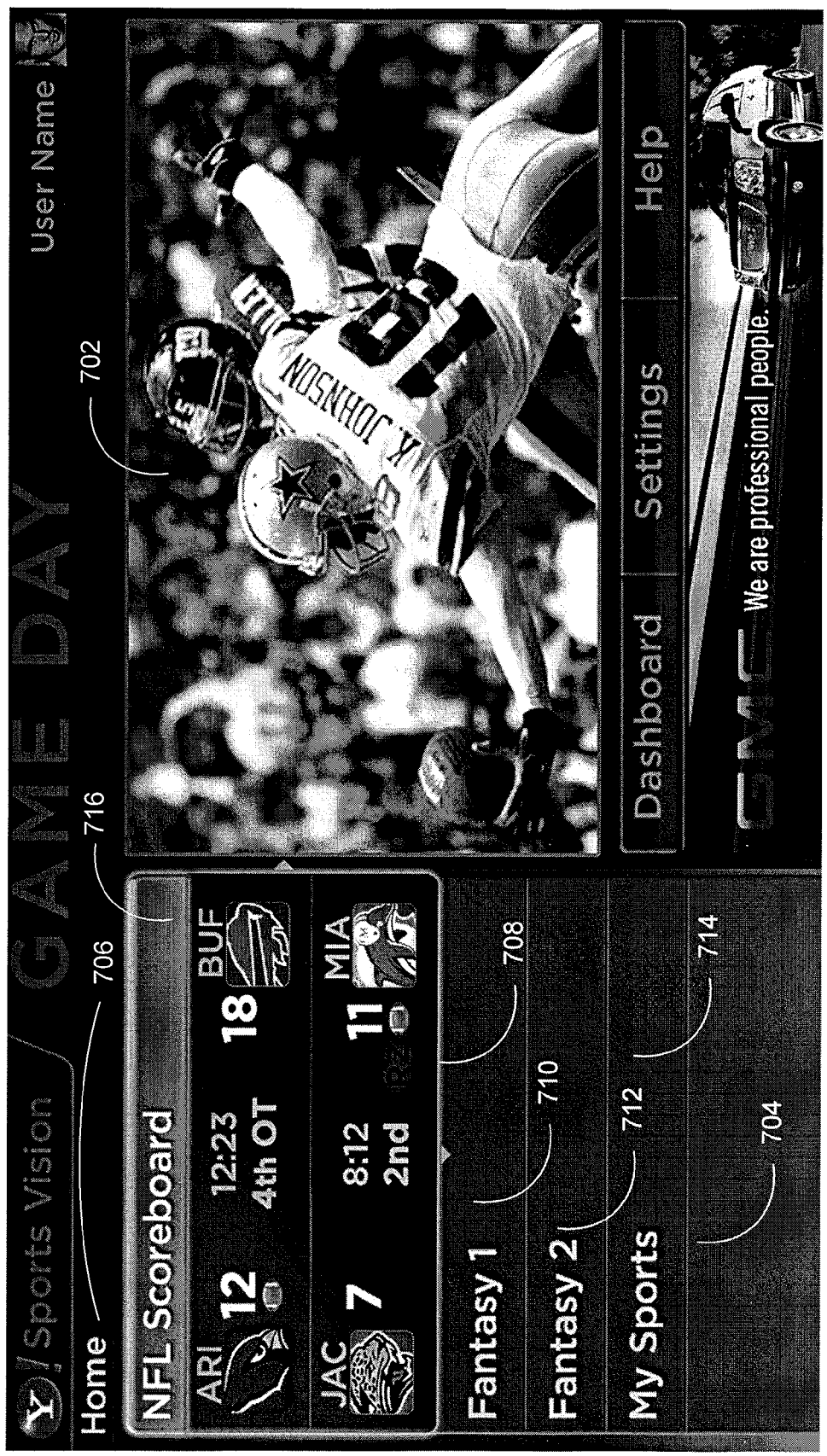
FIG. 7 is a screen diagram illustrating a first level view of a button hierarchy according to one embodiment of the present invention.

Logic or similar program code at the real time interface generator 206 and the fantasy interface generator 208 utilize the data that a given generator 206 and 208 receives from the statistics interface 212 to generate a real time button hierarchy and a fantasy button hierarchy, respectively. Advantageously, embodiments of the invention contemplate that buttons in a given button hierarchy are dynamically updated as the generators 206 and 208 receive new or modified statistics, e.g., from the statistics data store or the fantasy management module. A client output interface 214 receives the out put of the generators 206 and 208, which includes, but is not limited to, a stream of video content and one or more hierarchies of buttons that provide visualization of information (which may be related to the video content) at various levels of granularity. FIGS. 7 though 10 illustrate examples of a specific button hierarchy.

The client output interface 214 is operative to format and combine output from the real time interface generator 206 and fantasy interface generator 208, as well as receive and process client requests. According to one embodiment, the client output interface 214 is operative to format the output that it receives. For example, where the profile information received from the profile access module 204 indicates that the user is accessing the interface provider through the use of a mobile device, the client output device 214 may format the received output for a mobile device, which may be specific to a make and model of mobile device through which the user is accessing the interface provider. Similarly, where the profile information received from the profile access module 204 indicates that the user is accessing the interface provide through the use of a device with a widescreen display, the client output device 214 may format the received output for a widescreen display. The client output device transmits the resultant output to the requesting client device over the network.

Figure 11:
FIG. 11 is a screen diagram illustrating a lens and a plurality of buttons for the visualization of sports information displayed in conjunction with aggregate NFL league information according to one embodiment of the present invention.

In addition to the output of button hierarchies for the visualization of information and video content, the real time interface generator 206 and fantasy interface generator 208 comprise logic or program code to generate one or more scoreboard displays. Using a scoreboard display, a given generator 206 and 208 visualizes league information for both professional and amateur sports leagues, as well as fantasy sports leagues, which may be presented as head to head or points based match-ups within a given fantasy league. For example, the real time interface generator 206 may generate a scoreboard that displays the performance of one or more games currently being played in a given sports league, or one or more games played in a given week of a season, etc. Similarly, the fantasy interface generator 208 generate a scoreboard that displays the performance of one or more head to head match-ups between fantasy teams in a given fantasy league, or a points based ranking for one or more fantasy teams in a given fantasy league. It should be noted that the information that the various levels of the button hierarchy are operative to visualize may be dependent on a given cell that the user selects in a given scoreboard. FIGS. 11 though 13 illustrate examples of a NFL, head to head and points based scoreboards, respectively.

Figure 3:
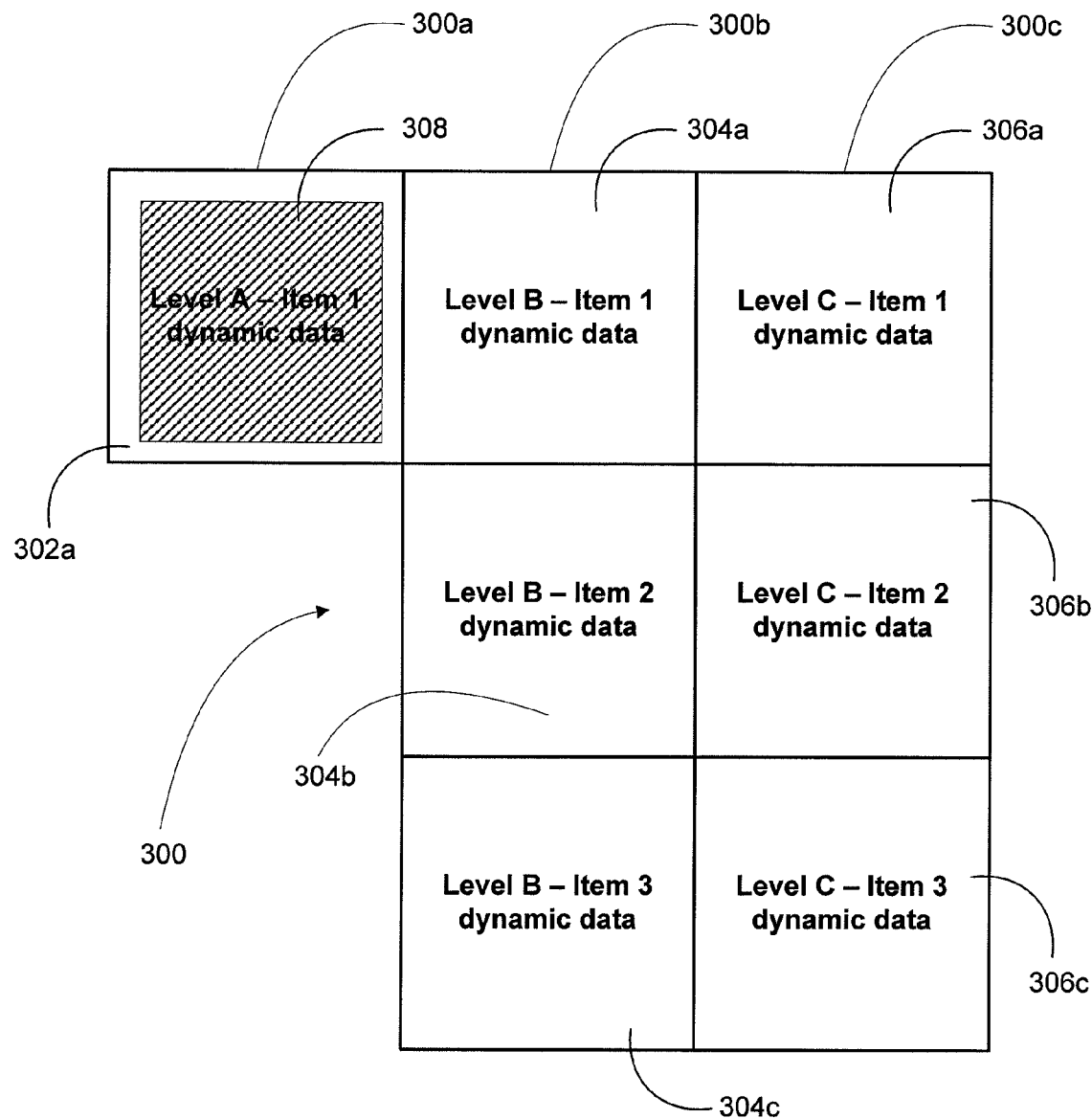
FIG. 3 is a block diagram illustrating a spatial navigation of a lens over one a plurality of buttons for the visualization of sports and fantasy sports information according to one embodiment of the present invention.

As indicated herein, buttons in accordance with the present invention for the visualization of information are arranged in accordance with a multi-level hierarchy. FIG. 3 illustrates one embodiment of a portion of such a hierarchy 300. The exemplary hierarchy comprises three levels: level A 300a, level B 300b and level C 300c. Each level provides for visualization of information at a greater granularity than that provided by a higher level. For example, data presented by the button at level C-item 2 306b is related to, but of a finer granularity, than the information presented by the button at level B-item 2 304b.

The button hierarchy 300 may also comprise a lens 308 that allows the user to focus on the dynamic data that a given button presents. In the present illustration, the lens 308 is situated such as to focus on the dynamic data presented by the item 1 button in level A 302a. According to one embodiment, the one or more buttons at level A are operative to dynamically display information regarding NFL games currently being played.

One or more buttons situated at level B 300b of the hierarchy 304a, 304b and 304c, provide information that is related to the information that the button at level A-item 1 302a is operative to visualize. The one or more buttons at level B 300b provide information that is related to a button situated at level A 300a, but with greater granularity or details. For example, where the button at level A-item 1 302a visualizes information regarding a given NFL game, the one or more buttons at level B 304a, 304b and 304c may provide various categories of information regarding the given NFL game with greater detail than the information that the button at level A-item 1 302a is operative to visualize. The user may visualize the dynamically changing data that the buttons in level B present by navigating the cursor to a button at level B 300b.

Cursor navigation may be accomplished through the transmission of control commands from a client device to the interface provider. Upon receipt of a control command, the UI generator transitions the focus of the lens onto the button indicated by the control command. It should be noted that other techniques for cursor navigation in video systems know to those of skill in the art may also be used in conjunction with systems and methods of the present invention.

One or more buttons situated at level C 300c of the hierarchy 306a, 306b and 306c, provide information that is related to the information that a given button at level B 300b is operative to visualize. The one or more buttons at level C 300c provide information that is related to a button situated at level B 300b, but with greater granularity or detail. According to the embodiment illustrated at FIG. 3, a given button situated at level B 300b is associated with a given button situated at level C 300c. For example, button level C-item 1 306a provides finer granularity of dynamically changing data that button level B-item 1 304a visualizes, button level C-item 2 306b provides finer granularity of dynamically changing data that button level B-item 2 304b visualizes and button level C-item 3 306c provides finer granularity of dynamically changing data that button level B-item 3 304c visualizes. Those of skill in the art recognize that the present hierarchy is but one embodiment and other hierarchies are contemplated, for example, were a given button at level B is associated with a plurality of buttons situated at level C. Similarly, a given hierarchy may have more levels or less levels that the present exemplary hierarchy.

Figure 4:
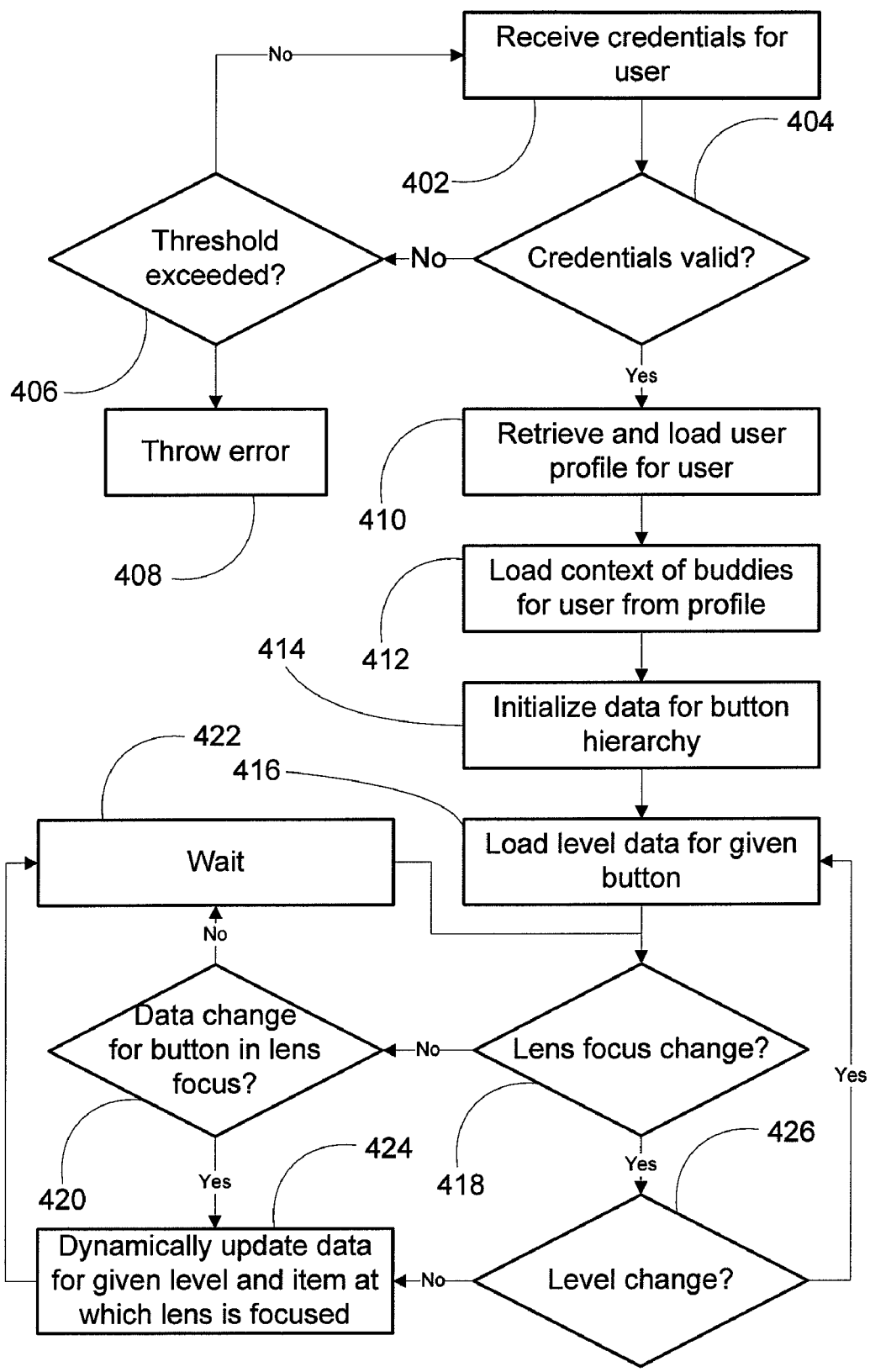
FIG. 4 is a flow diagram illustrating a process for information visualization according to one embodiment of the present invention.

One embodiment of a method for navigation and visualization of data in a generic button hierarchy is illustrated at FIG. 4. The method may begin with the receipt of user credentials by access logic at an interface provider, step 402. The credentials may comprise data that allows the system to positively and validly identify the user. Credentials may include, but are not limited to a user name and password, a biometric token, etc. A check is performed to determine the validity of the credentials, step 404. Validating the credentials may comprise checking the incoming credentials against a stored credential, such as when stored password against which access logic may validate an incoming password.

Where the user fails to supply valid credentials, step 404, a check is performed to determine if the user is exceeding a login threshold, step 406. The threshold may be based one or more of a number of factors including, but not limited to, the number of failed login attempts using a given username, the number of failed login attempts from a given PC, the number of failed login attempts from a given IP address, etc. Where the user is not exceeding the threshold, step 406, processing returns to step 402, providing the user with a subsequent opportunity to supply valid credentials. If the user is exceeding the threshold, however, processing continues at step 408 with the system throwing an error to the client device that the user is utilizing. Additionally, the system may prevent the user from initiating a login attempt for a given time window in conjunction with other criteria, e.g., denying a login attempt from the IP address for the client device for a thirty minute window.

When the user supplies credentials that the system is capable of validating, step 404, profile information is retrieved from the profile for the user supplying the valid credentials, step 410. According to one embodiment, the UI generator and fantasy management module receive the profile information, on the basis of which they collect data and build interfaces for the visualization of information. The profile may also identify one or more buddies of the user, for which the system retrieves a context, step 412. A context for a user or a buddy, according to one embodiment, is a notion of an action that a given user is performing at a given point in time, which may also include the location from which the user is performing that action. By knowing the context of the user and his or her buddies, the system may allow the user to exchange data with his or her buddies, such as voice chat, images and instant messages, in accordance with the systems and methods incorporated herein by reference. Providing communication channels between viewers in a television environment allows viewers to discuss programs that a given user is watching and is operative to facilitate "smack talk" between viewers of a sporting event or participants in a fantasy sports league.

On the basis of the event or events that the user is viewing, the UI generator initializes a button hierarchy and data for visualization using the same, step 414. For example, where the method is generating a button hierarchy for the visualization of NFL games, initialization may comprise identification of games for which data is to be visualized, as well as identification of statistics regarding the same. Appropriate components at the UI generator load the data for visualization into appropriate buttons at a given level in the button hierarchy, step 416. Thereafter, the top level of the hierarchy is transmitted to a client device for display. Alternatively, a user profile may identify a button situated at a given position in the button hierarchy at which visualization is to begin, e.g., setting the focus to a statistics button for a given NFL game. Still alternatively, the lens may focus on a button through which the user was visualizing information the last time the user exited the system.

A check is performed to determine if the user initiates a lens focus change, step 418, e.g., moves the lens from a first button in the hierarchy to a subsequent button in the hierarchy. As described above, movement of the lens and navigation of the hierarchy may be accomplished by the transmission of control commands from a remote control under the operation of the user as is know to those of skill in the art. Where a lens focus change does not occur, step 418, a check is performed to determine if there is a data change for the button upon which the lens is focusing, step 420. Where there is no data change, the method enters a wait state, with processing returning to step 418 upon the expiration of a wait period. Where the is a data change, step 420, data for the button upon which the lens is focusing is updated to reflect the data change, step 424. Alternatively, the buttons in the hierarchy, in addition to the button upon which the lens is focusing, are checked to determine if there have been any data changes, updating the buttons as appropriate on the basis of any data changes. Accordingly, a given button visualizes data that changes in reaction to the receipt of data changes, which may be in real time or near real time.

Returning to the check for a lens focus change at step 418, where the user issues a command to move the focus of the lens from a first button to a subsequent button, a check is performed to determine if the focus change is from a first level to a subsequent level, step 426. Where the user executes a level change, appropriate components at the UI generator load the data for visualization into appropriate buttons at a given level in the button hierarchy, step 416. Where the focus change is among buttons in a given level, the UI generator transitions the focus of the lens to the subsequent button in the current row, which may comprise updating data that the button visualizes, step 424.

Figure 5:
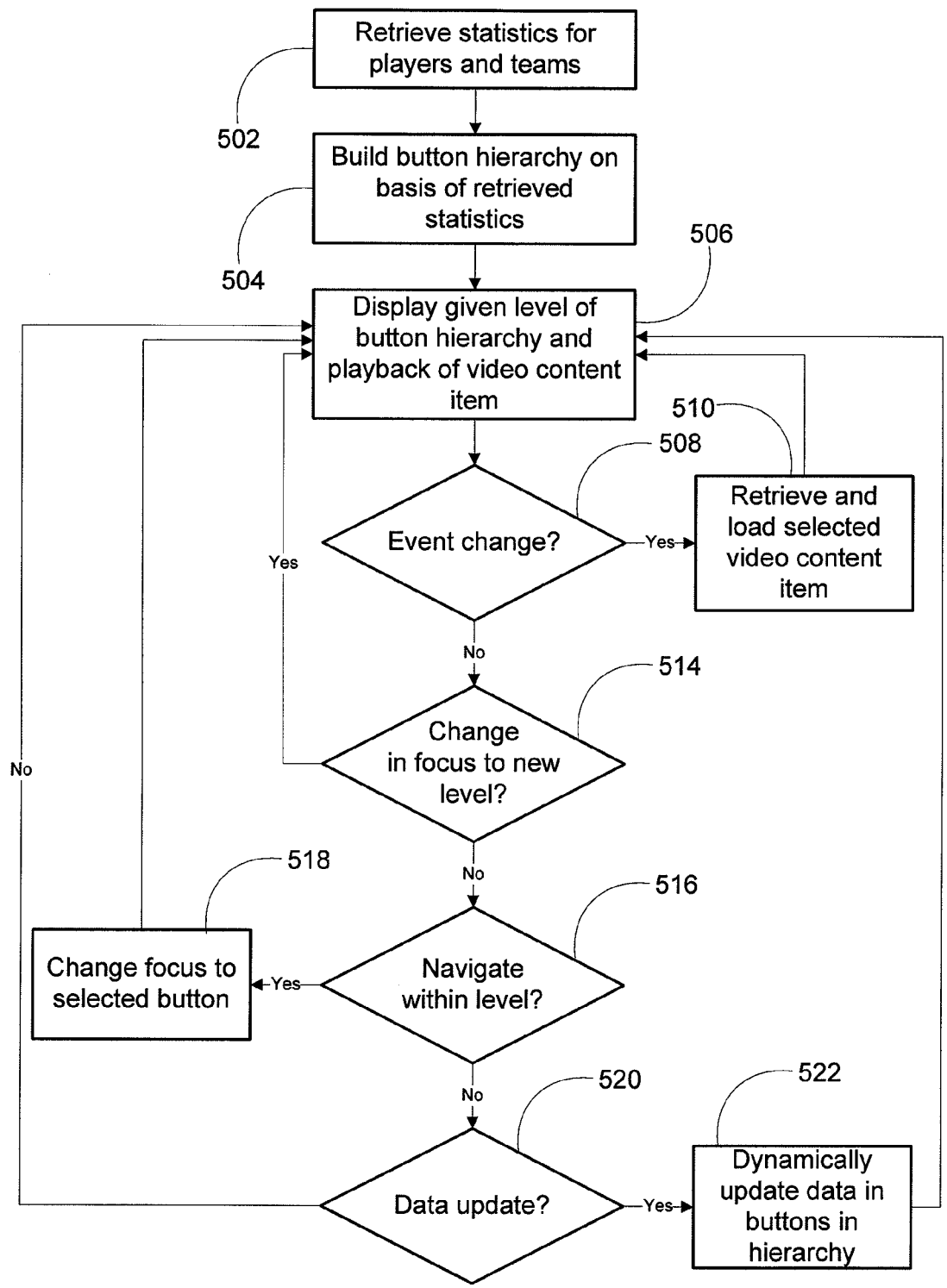
FIG. 5 is a flow diagram illustrating a process for visualizing information regarding live or recorded NFL events according to one embodiment of the present invention.

FIG. 5 presents and alternative embodiment of a method for navigation and visualization of data a button hierarchy directed towards visualization of data related to NFL games. The method in accordance with FIG. 5 begins with the retrieval of statistics for NFL players and the team upon which they play, step 502, which may include other information regarding players and teams as has been described herein. The scope of data retrieved may depend on the context upon which the method is operating. According to one embodiment, the system retrieves statistics for players and teams that are playing live games when then method begins. Alternatively, a system operating in accordance with the method of the present embodiment retrieves data for NFL games that have been played during a time window, e.g., in the past two days, the past week, etc.

The UI generator, which may comprise utilization of a real time interface generator, builds a button hierarchy on the basis of the retrieved player and team statistics and related information, step 504. According to one embodiment, the button hierarchy is a four level hierarchy with a home level as the top level of the hierarchy, an NFL level comprising a second level of the hierarchy, a game detail level and a statistics level as third and fourth levels, respectively. For example, the NFL level may visualize information regarding one or more NFL games, the detail level may visualize high level information regarding the teams playing a given game according to one or more vectors (e.g., player stats, team stats, etc.), and the statistics level visualizing information regarding the teams playing a given game according to one or more vectors at a higher level of granularity. The method continues with the display of a given button at a given level of the button hierarchy, step 506, which may be in conjunction with playback of a given video content item, e.g., live or recorded NFL game.

The process enters a series of nested decision blocks that provide logic for receiving and processing user input, e.g., channel changes and button navigation. A first check determines if the user has changed the sporting event he or she is currently watching, step 508, for example, changes the channel from the Jets game to the Cowboys game when watching an NFL game. Where the check at step 508 evaluates to true, the NFL game playing on the channel to which the user tunes or otherwise indicates as selecting for playback is retrieved from a video data store and loaded for playback, step 510. The video content item begins playback and the lens may change the button upon which it is focusing on the basis of the selected video content item, step 506.

Where the user does not issue a command to change a video content item for an event that is being played back, steps 506 and 508, a check is performed to determine if the user navigates the focus of the lens to a different level of the button hierarchy, step 514. Where the check evaluates to true, data for a given button the in the level to which the user navigates is selected for visualization of the data contained therein, step 506. For example, assume that the user is navigating the focus of the lens among a plurality of first buttons for visualizing high level data regarding NFL games presently in progress, the buttons arranged in accordance with a first level of a button hierarchy. Where the user selects a given first button, the interface transitions to display of one or more second buttons for visualizing data regarding an NFL game identified by the selected first button at a finer granularity.

Where the user does not change the focus to a new level, step 514, a check is performed to determine if the user is navigating among buttons within a given level in the button hierarchy, step 516. Where the user is moving the focus among buttons in within a given level, the interface transitions the focus of the lens between buttons to visualize information in accordance with a similar granularity, step 518. For example, where the lens is in a level for visualizing high level NFL game data, a first button in the focus of the lens may display information regarding the Jets game, a second button in the focus of the lens that is situated at the same level as the first button may display information regarding the Raiders game and a third button in the focus of the lens, situated at the same level as the first button and the second button, may display information regarding the 49ers game. Processing returns to step 506.

Where the user has not generated any navigation events, steps 508, 514 and 516, a check is performed to determine if there has been an update to the data that a given button in the hierarchy visualizes, step 520. For example, where the lens is focusing on a button providing high level visualization of information regarding the Raiders game, and the Raiders score a touchdown, updated data is propagated to the UI that the client device displays, step 522, thereby updating the data that a given button visualizes when coming into the focus of the lens. Regardless of whether there is updated data for a given button in the button hierarchy, processing returns to step 506. It should be appreciated by those of skill in the art that the exemplary navigation techniques illustrated in FIGS. 4 and 5 are applicable to navigation of any button hierarchy, such as a multilevel hierarchy for the visualization of fantasy sports information. For example, a multilevel button hierarchy may comprise levels that include, but are not limited to "Home", "League", "Detail" and "Players" for a given fantasy sports league.

Figure 6:
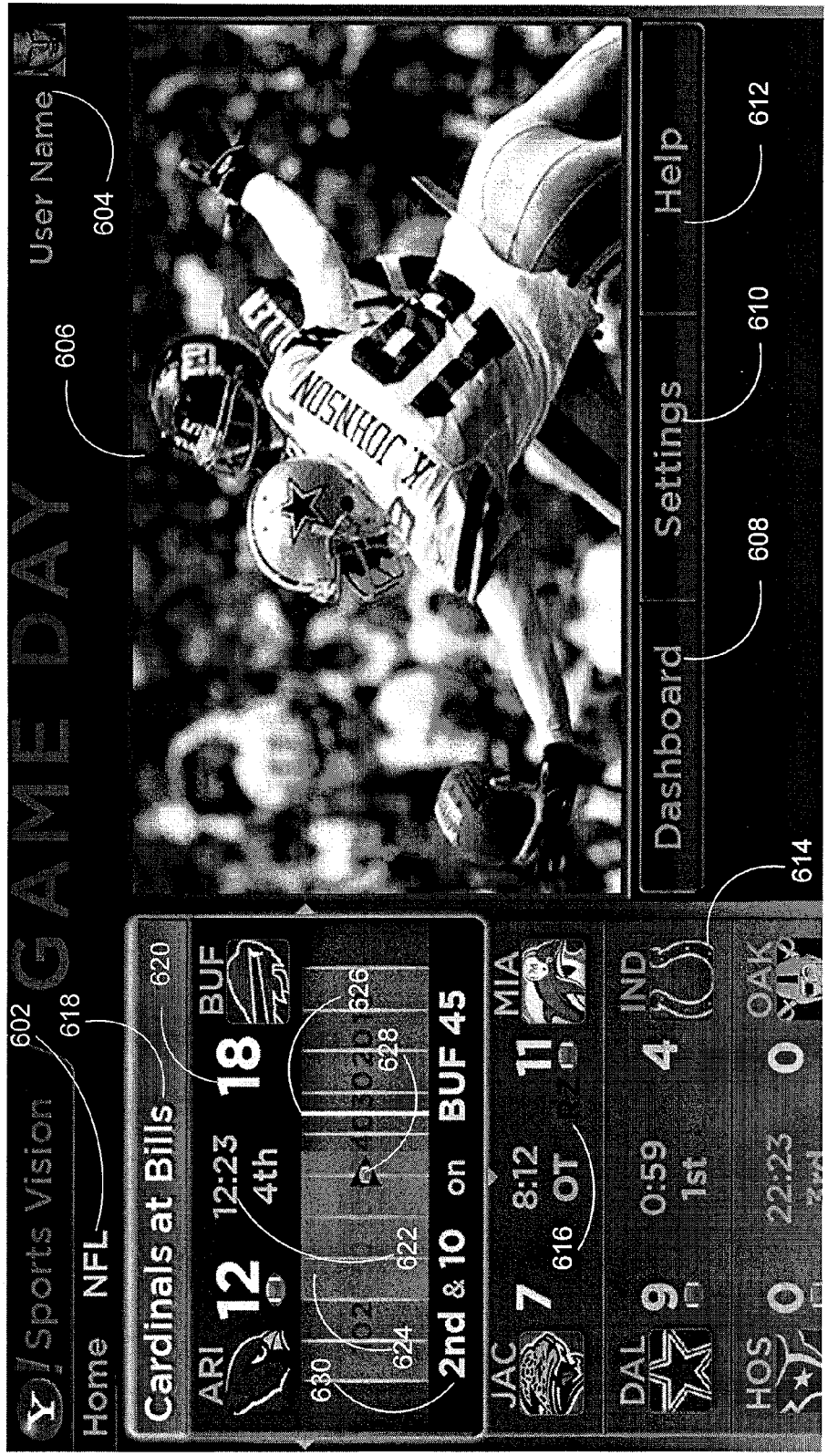
FIG. 6 is a screen diagram illustrating a lens and a plurality of buttons for the visualization of sports information displayed in conjunction with a sports broadcast according to one embodiment of the present invention.

FIGS. 6 through 13 present various embodiments of the interfaces generated by systems and methods of the present invention for the visualization of information. FIG. 6 illustrates an interface or screen diagram for the displaying a second level of a button hierarchy for visualizing NFL game information in conjunction with a video content item of the Giants vs. Cowboys game 606. The UI generator displays user identification information 604, which may be retrieved from a user profile during the login process. Navigation controls are also provided for navigation of the system, in addition to the visualization of event information through the button hierarchy. Navigation controls include, but are not limited to a "dashboard" view 608 (also referred to herein as a "scoreboard" view), a settings control 610 (which allows the user to set and edit preference information, e.g., favorite teams, fantasy sports information, etc.) and a help control 612 that provides the user access to system help functions.

At least a portion of the buttons comprising a button hierarchy are situated on the left hand side of the exemplary interface. The lens is presently focused in the second level of the hierarchy as indicated by the highlighted "NFL" icon 602 in a second position (the first level of the hierarchy in the present example is identified by the "Home" icon). The second level of the button hierarchy 614 is displayed below the level icon 602, with a given button in the level visualizing information regarding a given NFL game. The focus of the lens 618 is situated on a button visualizing information for the Arizona vs. Buffalo game. Like other buttons in the same level, the button under the focus of the lens 618 presents information regarding the score of the game 620, as well as quarter and time remaining information 622. Buttons may visualize alerts regarding the presence of certain statistics. For example, program code at the UI generator may identify when a given team is in the "red zone" and display or otherwise visualize an appropriate alert 616 in a given button.

In addition to high level information regarding a game, the button upon which the lens is focusing visualizes information regarding the game. According to the present example, the button displays the direction of the drive and location of the ball on the field 628, the first down line 626 and the distance covered by the present drive 624. Similarly, the information regarding the current down is displayed 630. Where the user issues an up or down navigation command to change the focus of the lens, e.g., navigates among buttons in the same level, the button coming within the focus of the lens visualizes high level information regarding the game in focus. For example, where the user navigates the lens to focus the button displaying the Jacksonville vs. Miami game, the button visualizes similar information as that visualized for the Arizona vs. Buffalo game.

FIGS. 7 through 10 are a series of screen shots illustrating navigation between levels of a button hierarchy according to one embodiment. Starting with FIG. 7, a UI generator displays top level of a button hierarchy in conjunction with the playback of a video content item 702. The top level of the button hierarchy is indicated by the "Home" icon 706 in a first position. The buttons in the first level 704 of the button hierarchy include, but are not limited to, NFL scoreboard 708, a first fantasy league 710, a second fantasy league 712 and a "my sports" section 714. The lens 716 is focusing on the NFL scoreboard button, which is visualizing information regarding NFL games at a highest level of granularity.

Figure 8:
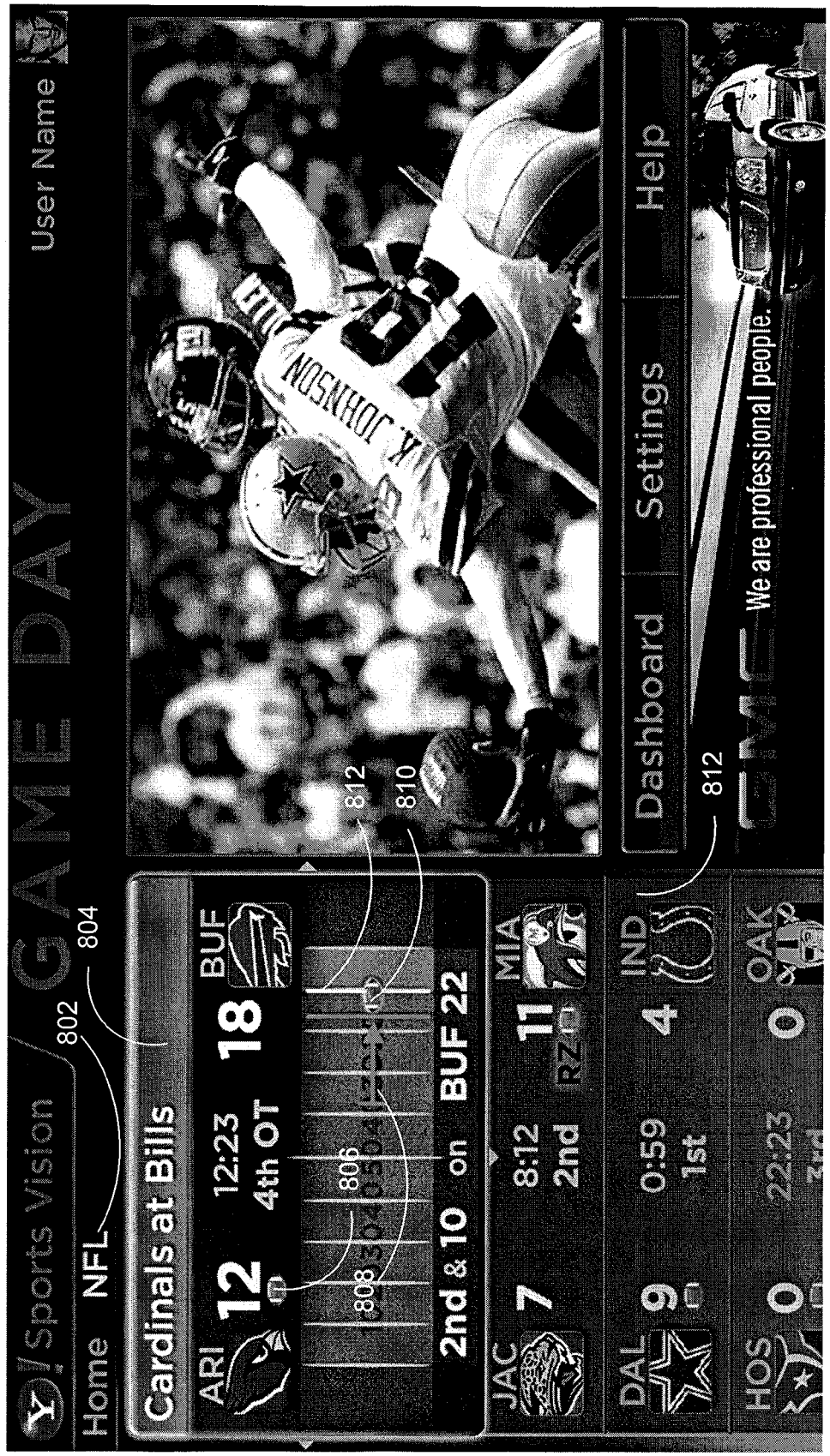
FIG. 8 is a screen diagram illustrating a second level of a button hierarchy according to one embodiment of the present invention.

When the user navigates from the first level of the button hierarchy to a second level, the exemplary second level of the button hierarchy illustrated in FIG. 8 may be displayed at the client device. The second level of the button hierarchy 802 is indicated by the "NFL" icon. The button that has the focus of the lens 804 is operative to visualize information regarding the game in focus at a level of granularity that is finer than that presented at the first level. For example, the button that has the focus visualizes ball position 810, possession 806, a drive indicator 808 and the first down marker 812. The user may navigate the focus of the lens 804 back up a level to the first level of the button hierarchy, down to other buttons in the same row of the button hierarchy or forward to a third level of the button hierarchy.

Figure 9:
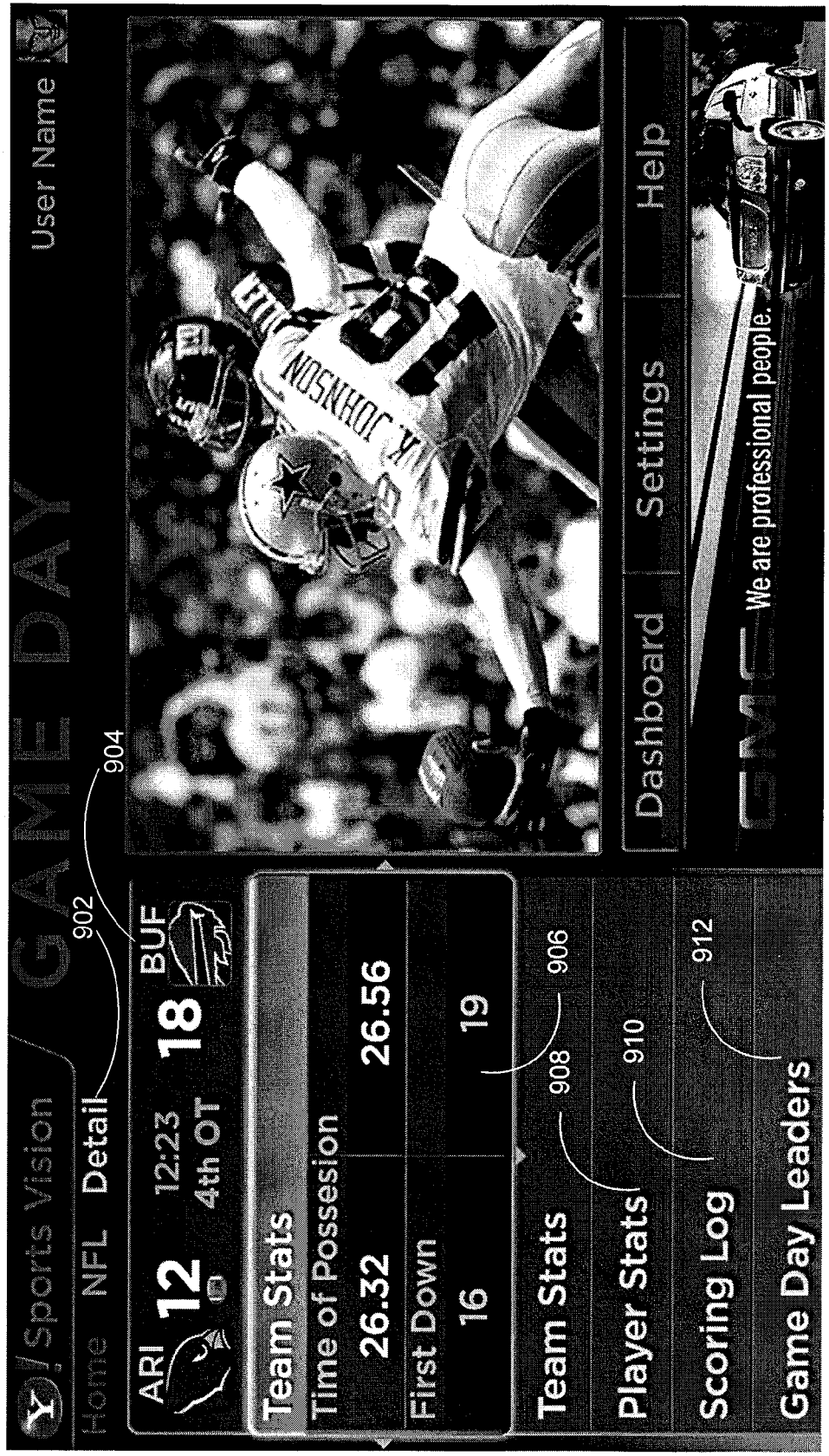
FIG. 9 is a screen diagram illustrating a third level of a button hierarchy according to one embodiment of the present invention.

When the user navigates from the second level of the button hierarchy to a third level, the exemplary third level of the button hierarchy illustrated in FIG. 9 may be displayed at the client device. The third level of the button hierarchy 902 is indicated by the "Detail" icon and presents detailed information regarding a game selected from the second level of the hierarchy. The third level of the button hierarchy comprises one or more buttons 908, 910 and 912 to visualize information that is related to a given button from the second level of the button hierarchy at a finer granularity than that provided by buttons in the second level. In the exemplary embodiment, the focus of the lens is on a button visualizing team statistics 906. It should be noted that as the game progresses and statistics information changes, the UI generator is operative to receive the changed statistics information according to the systems and methods described herein for use in updating information that a given button is visualizing, e.g., team stats 906.

Figure 10:
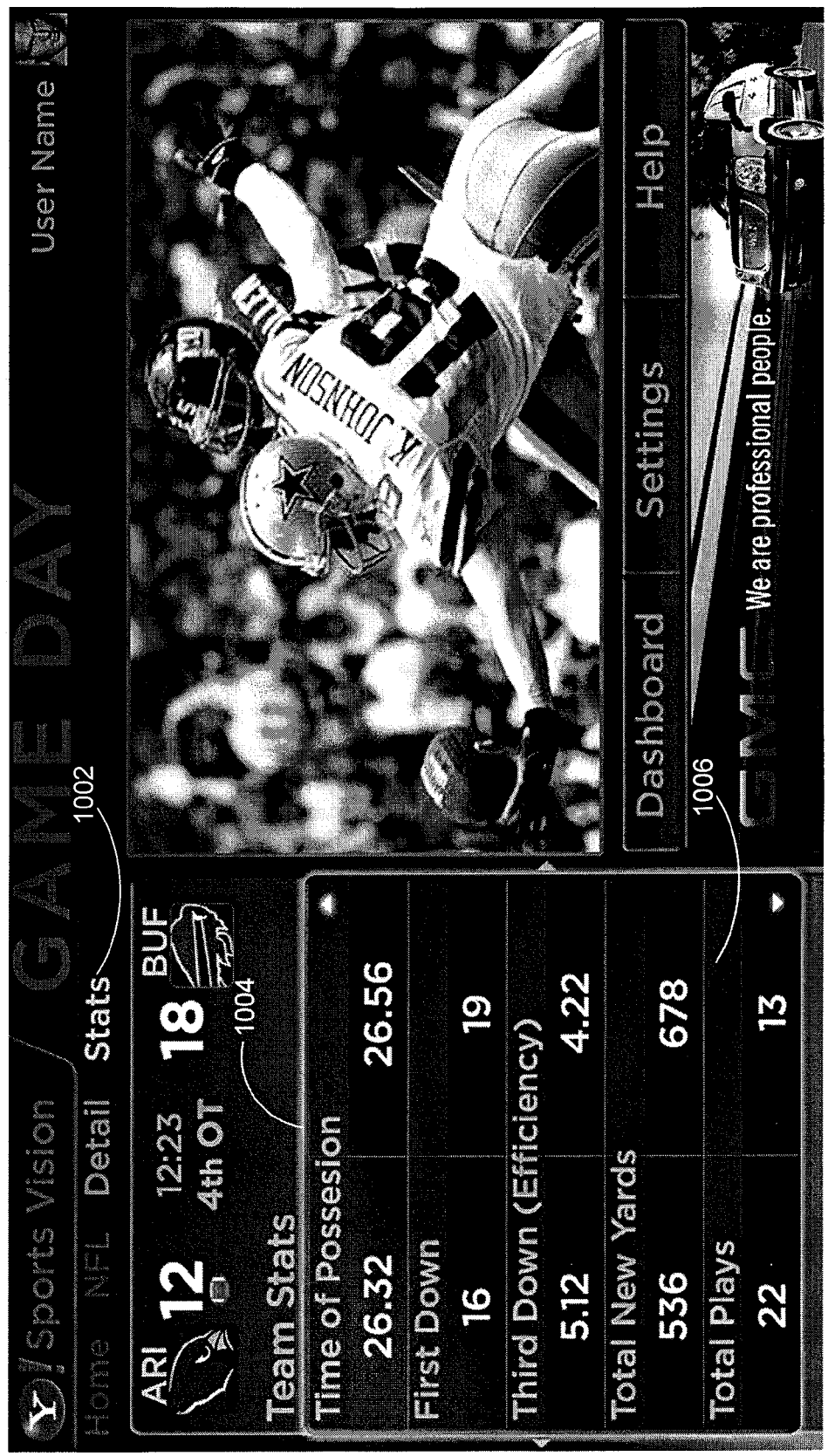
FIG. 10 is a screen diagram illustrating a fourth level of a button hierarchy according to one embodiment of the present invention.

When the user navigates from the third level of the button hierarchy to a fourth level, the exemplary fourth level of the button hierarchy illustrated in FIG. 10 may be displayed at the client device. The fourth level of the button hierarchy is indicated by the "Stats" icon 1002 and presents visualization of detailed information regarding a given statistic selected from the third level of the hierarchy, but at a finer granularity than buttons in the third level of the hierarchy provide. In the exemplary embodiment, the focus of the lens 1004 is on a button visualizing team statistics 1006. As this button is the only button at this level in the hierarchy associated with the button from the prior level, the user may navigate the focus of the lens back up a level of the hierarchy or forward to a subsequent level of the hierarchy.

Figure 12:
FIG. 12 is a screen diagram illustrating a lens and a plurality of buttons for the visualization of fantasy sports information displayed in conjunction with head to head fantasy league information according to one embodiment of the present invention.
Figure 13:
FIG. 13 is a screen diagram illustrating a lens and a plurality of buttons for the visualization of fantasy sports information displayed in conjunction with points based fantasy league information according to one embodiment of the present invention.

As described above, the UI generator is operative to generate scoreboard views for a given sport or fantasy sport, in addition to buttons for a button hierarchy. FIGS. 11 through 13 illustrate various embodiments of exemplary scoreboards. Turing to FIG. 11, the scoreboard illustrates high level information for one or more games taking place in the NFL 1104 and may be accessed by the selection of a scoreboard control 1102, which is also referred to as a dashboard. The scoreboard is divided into a plurality of cells 1106, with a given cell presenting high level information for a given game. The UI generator may also utilize statistics that it receives to provide alerts for certain games, such as a successful field goal 1108 or entry into the red zone 1110.

Turing to FIG. 12, the scoreboard illustrates high level information for one or more games taking place in a fantasy football league 1202 referred to as "Big Oak". The scoreboard is divided into a plurality of cells 1204, with a given cell presenting high level information for a given head to head match-up in the Big Oak fantasy football league. Similarly, FIG. 13 illustrates one embodiment of a scoreboard for points based ranking of fantasy teams in the Big Oak 1302 fantasy football league. The scoreboard is divided into a plurality of cells 1308 that are arrange in descending order of the number of points for a given team. Controls are provided to view points based ranking for over the past week 1306 or over the current season 1304.

FIGS. 1 through 13 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A method for providing visualization information to a user display device, the method comprising:
    validating one or more user supplied credentials for a user in order to access a user profile for the user;
    generating a plurality of buttons based on the user profile, the plurality of buttons arranged in a button hierarchy;
    generating a display of a first level of the button hierarchy comprising one or more first level buttons, the one or more first level buttons including one or more scoreboards;
    generating a display of a lens focusing on a given one of the one or more first level buttons, the lens operative to present first level data for the given first level button;
    receiving a selection of the given first level button focused by the lens;
    identifying statistical information associated with the given first level button;
    generating a display of a second level scoreboard corresponding to the given first level button and a second level of the button hierarchy comprising one or more second level buttons, the one or more second level buttons including the identified statistical information associated with the first level button;
    receiving a selection of a given second level button corresponding to a given identified statistical information associated with the first level button; and
    generating a display of a third level scoreboard corresponding to the given first level button and a third level of the button hierarchy comprising one or more third level buttons, the one or more third level buttons including statistical information associated with the given second level button from the second level of the button hierarchy at a finer granularity than that provided by the given second level button.

2. The method of claim 1 comprising identifying an event type, wherein the event type is a sporting event.

3. The method of claim 2 wherein the sporting event is selected from the set of events consisting of football, baseball, basketball, hockey, soccer and rugby.

4. The method of claim 2 wherein the event is a fantasy sports event, the method further comprising:
    displaying fantasy sports event information based on the user profile information in conjunction with the first level buttons and the one or more second level buttons.

5. The method of claim 1 wherein the first level data changes dynamically.

6. The method of claim 1 comprising navigating the lens between the one or more first level buttons and wherein the first level data changes as a function of a given first level button.

7. The method of claim 6 comprising:

presenting an informational display pane in conjunction with the button hierarchy; and modifying information that the informational display pane displays in response to the navigation.

8. The method of claim 7 wherein the information is related to the given first level button.

9. The method of claim 1 wherein displaying a given second level button comprises displaying second level data for the given second level button.

10. The method of claim 9 comprising navigating the lens between the one or more second level buttons and wherein the second level data changes as a function of a given second level button.

* * * * *